United States Patent
Kim et al.

(10) Patent No.: US 8,351,784 B2
(45) Date of Patent: Jan. 8, 2013

(54) PACKET-OPTICAL INTEGRATED SWITCH WITHOUT OPTICAL TRANSPONDER

(75) Inventors: Hong Ju Kim, Daejeon (KR); Hyun Woo Cho, Daejeon (KR); Ji Wook Youn, Daejeon (KR); Hyun Jae Lee, Daejeon (KR); Bup Joong Kim, Daejeon (KR); Sun Me Kim, Daejeon (KR); Byung Jun Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 521 days.

(21) Appl. No.: 12/628,983

(22) Filed: Dec. 1, 2009

(65) Prior Publication Data
US 2010/0135659 A1  Jun. 3, 2010

(30) Foreign Application Priority Data
Dec. 2, 2008 (KR) .............. 10-2008-0121239
Apr. 29, 2009 (KR) .............. 10-2009-0037575

(51) Int. Cl.
*H04J 14/00* (2006.01)
(52) U.S. Cl. ............... 398/51; 398/54; 398/47; 398/56; 398/79
(58) Field of Classification Search ............... 398/51, 398/54, 45, 56, 79, 47; 370/392
See application file for complete search history.

(56) References Cited

U.S. PATENT DOCUMENTS

| | | | |
|---|---|---|---|
| 5,739,933 A | 4/1998 | Dembeck et al. | |
| 7,003,089 B1 * | 2/2006 | Reusens | 379/252 |
| 7,164,692 B2 * | 1/2007 | Cox et al. | 370/466 |
| 7,633,933 B2 * | 12/2009 | Parker et al. | 370/352 |
| 7,729,617 B2 * | 6/2010 | Sheth et al. | 398/135 |
| 2003/0002505 A1 * | 1/2003 | Hoch et al. | 370/392 |
| 2003/0067655 A1 * | 4/2003 | Pedersen et al. | 359/152 |
| 2004/0202198 A1 * | 10/2004 | Walker et al. | 370/474 |
| 2005/0117905 A1 * | 6/2005 | Lee et al. | 398/79 |
| 2005/0141517 A1 * | 6/2005 | Choi et al. | 370/395.31 |
| 2006/0092988 A1 * | 5/2006 | Lee et al. | 370/538 |
| 2006/0109782 A1 * | 5/2006 | Ra et al. | 370/216 |
| 2010/0074624 A1 * | 3/2010 | Miller et al. | 398/98 |
| 2011/0286744 A1 * | 11/2011 | Shin et al. | 398/45 |

FOREIGN PATENT DOCUMENTS

| | | |
|---|---|---|
| JP | 09-121372 A | 5/1997 |
| KR | 2006-0039533 A | 5/2006 |

* cited by examiner

Primary Examiner — Kenneth N Vanderpuye
Assistant Examiner — Hibret Woldekidan
(74) Attorney, Agent, or Firm — Rabin & Berdo, P.C.

(57) ABSTRACT

A packet-optical integrated switch without an optical transponder, includes: a packet line card configured to output an Ethernet packet signal to a pre-set output port; a packet switch fabric configured to transfer the packet signal from the packet line card to the output port previously set in a destination address included in the packet signal; a 10 gigabit Ethernet (10 GbE)/optical transport unit level 2 (OTU2) integrated line card configured to convert the packet signal from the packet switch fabric into an OTU2 optical signal having a pre-set wavelength; and a wavelength selection switch fabric configured to allocate the optical signal from the 10 GbE/OTU2 integrated line card to a pre-set wavelength division multiplexing (WDM) port by pre-set wavelength to exchange the optical signal to each port by wavelength, wherein the packet line card, the packet switch fabric, the 10 GbE/OTU2 integrated line card, and the wavelength selection switch fabric perform the reverse operations of the process, respectively.

8 Claims, 9 Drawing Sheets

PACKET-OPTICAL INTEGRATED SWITCH WITHOUT OPTICAL TRANSPONDER

CROSS-REFERENCE TO RELATED APPLICATIONS

This application claims the priorities of Korean Patent Application Nos. 10-2008-0121239 filed on Dec. 2, 2008 and 10-2009-0037575 filed on Apr. 29, 2009, in the Korean Intellectual Property Office, the disclosures of which are incorporated herein by reference.

BACKGROUND OF THE INVENTION

1. Field of the Invention

The present invention relates to a packet-optical integrated switch applicable for a packet-optical transport network (P-OTN) system and, more particularly, to a packet-optical integrated switch without an optical transponder capable of simplifying conversion and switching between a packet signal of an Ethernet (10 gigabit Ethernet: 10 GbE) and an optical signal of an optical transport unit level 2 (OTU2) and reducing production costs.

2. Description of the Related Art

In general, a packet network technique and an optical transport network technique have been separately developed in different regions.

As optical communication techniques are advancing, a technique that connects parts of the Internet via optical cables has been steadily developed, and accordingly, development and research efforts focused on matching an Ethernet layer signal in relation to a packet network technique with an optical transport layer signal are actively ongoing.

The related art method for connecting a 10-gigabit Ethernet (10 GbE) signal, a type of interconnection signal between a packet switch and an optical switch in relation to the matching of such an Ethernet layer signal and an optical transport layer signal will now be described with reference to FIG. 1.

FIG. 1 illustrates an interconnection between a packet switch and an optical switch according to the related art.

As shown in FIG. 1, referring to interconnection between the packet switch 10 and the optical switch 20, the related art packet switch 10 includes a first line card 11 for classifying a packet signal of a 1-gigabit Ethernet (1 GbE) or a 10-gigabit Ethernet (10 GbE) and outputting it to a corresponding output port, a packet switch fabric 12 for switching the packet signal from the first line card 11 to a port corresponding to a destination address included in the packet signal, and a second line card 13 for processing and classifying data upon recognition of header information of the packet signal from the packet switch fabric 12 to form a 10-GbE signal and performing a photoelectric transformation on the signal into an optical signal of a pre-set wavelength.

In this case, the first line card 11, the packet switch fabric 12, and the second line card 13 perform the reverse operations of the above process, respectively.

Also, the optical switch 20 includes an optical transponder 21 for converting an optical signal from the packet switch 10 into an electric signal and converting the electric signal into an optical signal of a pre-set wavelength, a wavelength selection switch fabric 22 for allocating the optical signal from the optical transponder 21 to a wavelength division multiplexing (WDM) port by wavelength, thus exchanging the optical signal to each port by wavelength, and an amplifying unit 23 for amplifying the WDM optical signal from the wavelength selection switch fabric 22.

In this case, the optical transponder 21, the wavelength selection switch fabric 22, and the amplifying unit 23 perform the reverse operations of the above process, respectively.

The above-described packet switch 10 outputs the 10 GbE optical signal, and the optical switch 20 should necessarily include the optical transponder 21 having the optical-electric-optical conversion function to multiple the outputted 10 GBE optical signal into WDM, and converts the 10 GbE optical signal into the OTU2 optical signal to thus generate the optical signal of the corresponding wavelength.

Meanwhile, in relation to the optical transport network field standardized with content as 'Interfaces for the optical transport network' in ITU-T G.709 and an Ethernet packet field standardized with a 10-GbE (Gigabit Ethernet) standard of IEEE 802.3ae as the P-OTN technique fields, a technique for effectively interconnecting a 10 GbE packet signal between the packet switch and the optical switch in the packet-optical integrated switch is required.

Currently, research and development efforts on the integration of a packet network technique and an optical transport network technique into a single device technique are ongoing. In this respect, however, interconnection between the related art packet switch and the optical switch requires the necessity of the presence of the line card in the packet switch and the optical transponder in the optical switch, increasing the fabrication cost and the installation cost due to the repetition in the configuration.

SUMMARY OF THE INVENTION

An aspect of the present invention provides a packet-optical integrated switch without an optical transponder, capable of simplifying conversion and switching between an Ethernet (10 GbE) packet signal and an optical transport unit level 2 (OTU2) optical signal and reducing a production cost by integrating a line card of a packet switch and an optical transponder of an optical switch and capable of selectively generating an Ethernet (10 GbE) optical signal or an OTU2 optical signal to extend its application range to thus provide flexibility.

According to an aspect of the present invention, it is provided a packet-optical integrated switch without an optical transponder, including: a packet line card configured to output an Ethernet packet signal to a pre-set output port; a packet switch fabric configured to transfer the packet signal from the packet line card to the output port previously set in a destination address included in the packet signal; a 10 gigabit Ethernet (10 GbE)/optical transport unit level 2 (OTU2) integrated line card configured to convert the packet signal from the packet switch fabric into an OTU2 optical signal having a pre-set wavelength; and a wavelength selection switch fabric configured to allocate the optical signal from the 10 GbE/OTU2 integrated line card to a pre-set wavelength division multiplexing (WDM) port by pre-set wavelength to exchange the optical signal to each port by wavelength, wherein the packet line card, the packet switch fabric, the 10 GbE/OTU2 integrated line card, and the wavelength selection switch fabric perform the reverse operations of the process, respectively.

The packet-optical integrated switch may further include: an amplifying unit configured to amplify the WDM optical signal from the wavelength selection switch fabric into a pre-set size, amplify an input WDM optical signal, and output the amplified WDM optical signal to the wavelength selection switch fabric.

The 10 GbE/OTU2 integrated line card may include a switch matching unit, a network processor, an interface conversion unit, and an XSBI/optical signal conversion unit, wherein the switching matching unit may match interface between the packet switch fabric and the network processor, the network processor may process and classify data included in the packet signal from the packet switch fabric based on header information included in the packet signal, the interface conversion unit may convert an interface of the network processor into a pre-set XSBI interface, and the XSBI/optical signal conversion unit may convert an XSBI packet signal, a parallel signal which has passed through the interface conversion unit, into an optical signal having a pre-set wavelength.

The interface conversion unit may be one of a 64B/66B PCS interface conversion unit that converts the interface of the network processor from an XGMII interface into the XSBI interface, and a LAN/PHY interface conversion unit that converts the interface of the network process from an SPI-4.2 interface into the XSBI interface.

The XSBI/optical signal conversion unit may be one of a 10 GbE/OTU2 matching module for converting the XSBI packet signal, the parallel signal which has passed through the interface conversion unit, into an OTU2 optical signal having a pre-set wavelength, and a 10 GbE optical module for converting the XSBI packet signal, the parallel signal which has passed through the interface conversion unit, into a 10 GbE optical signal.

The 10 GbE/OTU2 matching module may include: a first interface unit configured to receive the 10 GbE parallel signal from the interface conversion unit; a first clock generation unit configured to generate a first reference clock based on a pre-set internal clock; a second clock generation unit configured to generate a second reference clock based on the pre-set internal clock; a 10 GbE/OTU 2 matching unit configured to convert the 10 GbE parallel signal, which has been received from the first interface unit based on the first reference clock, into an OTU2 parallel signal according to the second reference clock, and generate a synchronized clock; a second interface unit configured to transfer the OTU2 parallel signal and the synchronized clock from the 10 GbE/OTU2 matching unit; a 10G-grade optical module unit configured to convert the OTU2 parallel signal transferred from the second interface unit into an OTU2 optical signal according to the synchronized clock; and a third interface configured to transfer the OTU2 optical signal from the 10G-grade optical module unit to an output stage, wherein the first interface unit, the 10 GbE/OTU2 matching unit, the second interface unit, the 10G-grade optical module unit, and the third interface perform the reverse operations of the above process, respectively.

When the 10 GbE/OTU2 matching module performs electro-optic transformation, the first reference clock may have 161.133 MHz and the second reference clock may have 669.326 MHz, and when the 10 GbE/OTU2 matching module performs photoelectric transformation operation, the first reference clock may have 167.332 MHz and the second reference clock may have 644.531 MHz.

The 10 GbE/OTU2 matching unit may include: a 10 GbE MAC processing unit configured to perform 64B/66B decoding process on the 10 GbE parallel signal from the first interface unit to remove an inter-packet gap, a preamble, a start flag identifier from the 10 GbE parallel signal to acquire a pure MAC payload; a generic framing procedure (GFP) processing unit configured to form the MAC payload from the 10 GbE MAC processing unit, as a GFP frame through encapsulation; an OPU2 processing unit configured to map a GFP-F frame from the GFP processing unit to a frame having an OPU2 overheader; an ODU2 processing unit configured to insert a overheader of an ODU2 level into an OPU2 frame from the OPU2 processing unit; and an OTU2 processing unit configured to insert an overheader of an OTU2 level into a signal from the ODU2 processing unit, wherein the 10 GbE MAC processing unit, the GFP processing unit, the OPU2 processing unit, the ODU2 processing unit, and the OTU2 processing unit perform the reverse operations of the above process, respectively.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
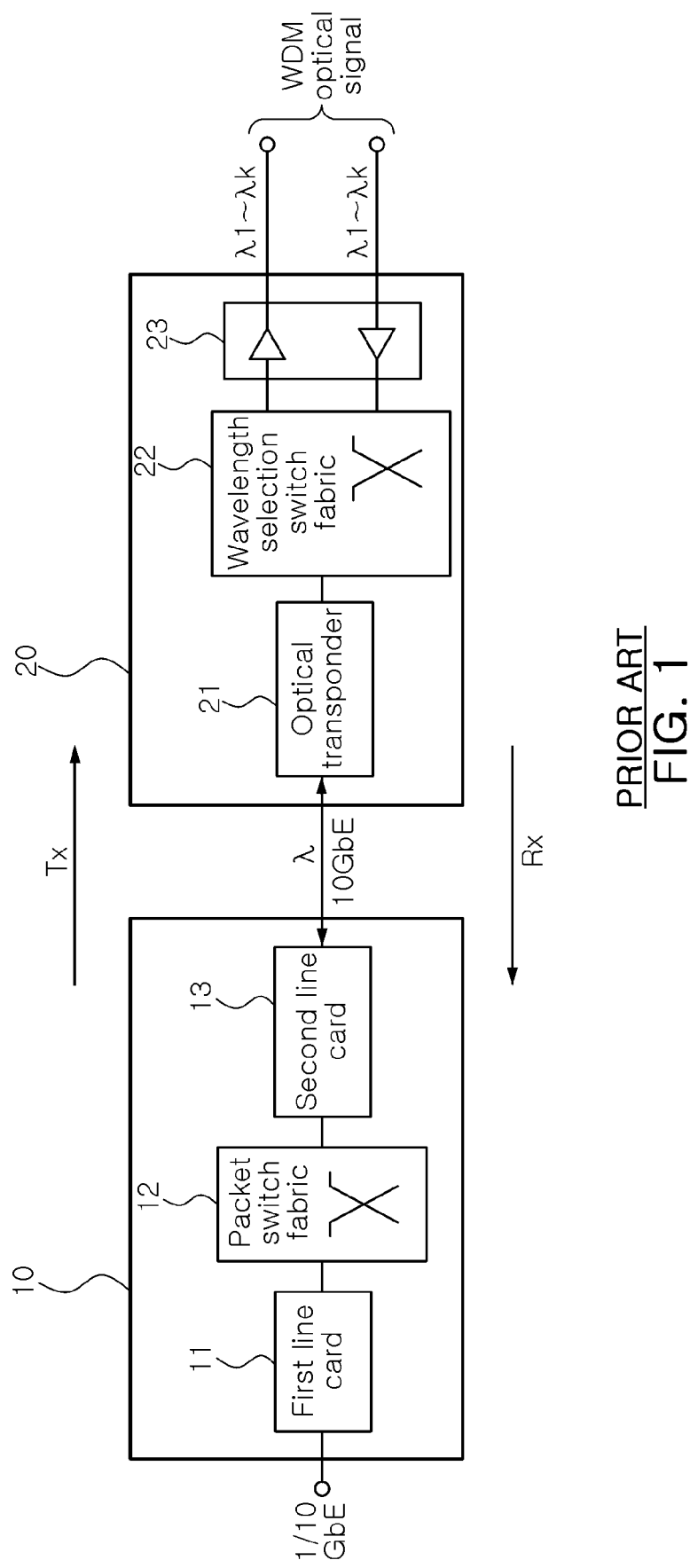
FIG. 1 illustrates an interconnection between a packet switch and an optical switch according to the related art.

Exemplary embodiments of the present invention will now be described in detail with reference to the accompanying drawings. The invention may however be embodied in many different forms and should not be construed as limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals will be used throughout to designate the same or like components.

Figure 2:
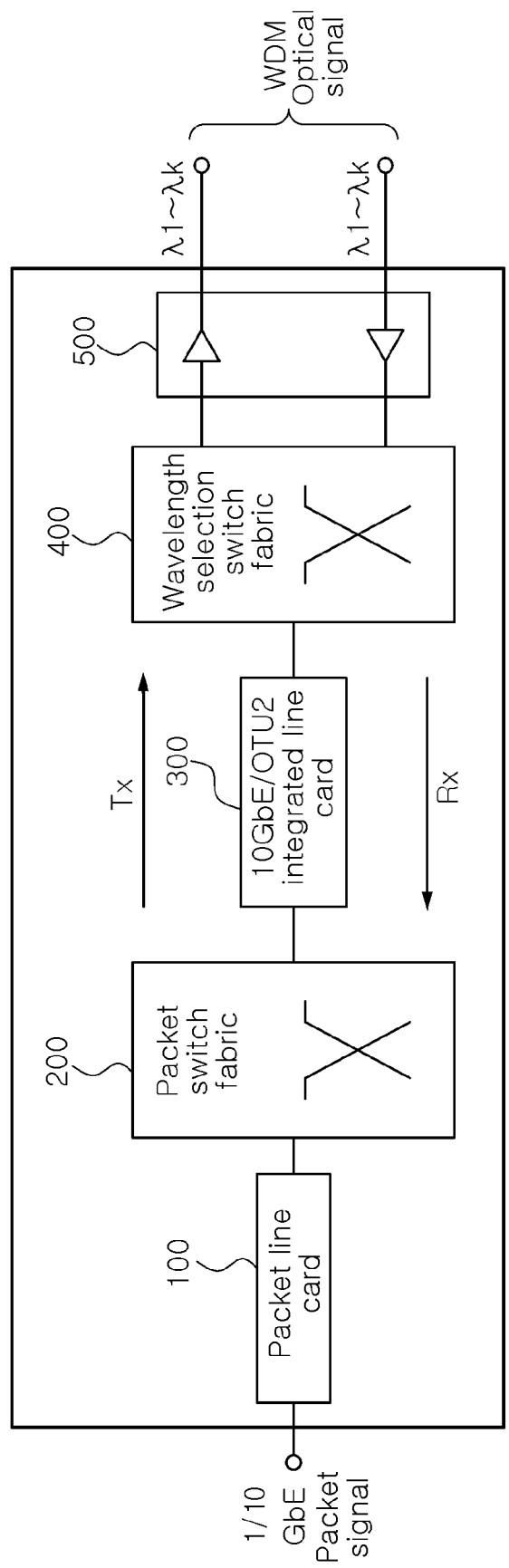
FIG. 2 is a schematic block diagram of a packet-optical integrated switch without an optical transponder according to an exemplary embodiment of the present invention.

FIG. 2 is a schematic block diagram of a packet-optical integrated switch without an optical transponder according to an exemplary embodiment of the present invention. As shown in FIG. 2, the packet-optical integrated switch according to an exemplary embodiment of the present invention includes a packet line card 100, a packet switch fabric 200, a 10 GbE/OTU2 integrated line card 300, and a wavelength selection switch fabric 400.

The packet line card 100 outputs a 1 GbE or 10 GbE etc. Ethernet packet signal to a pre-set output port based on header information of a packet signal. The packet switch fabric 200 switches the packet signal from the packet line card 100 to an output port previously set in a destination address included in the packet signal. The 10 GbE/OTU2 integrated line card 300 converts the packet signal from the packet switch fabric 200 into an OTU2 optical signal having a pre-set wavelength. The wavelength selection switch fabric 400 allocates the optical signal from the 10 GbE/OTU2 integrated line card 300 to a pre-set WDM port by pre-set wavelength to thus exchange the optical signal to each port by wavelength.

In this case, the packet line card 100, the packet switch fabric 200, the 10 GbE/OTU2 integrated line card 300, and the wavelength selection switch fabric 400 of the packet-optical integrated switch perform the reverse operations of the above-mentioned process.

Also, the packet-optical integrated switch according to an exemplary embodiment of the present invention may further include an amplifying unit 500. The amplifying unit 500 may amplify the WDM optical signal from the wavelength selection switch fabric 400 into a pre-set size, or amplify an input WDM optical signal to output to the wavelength selection switch fabric 400.

Figure 3:
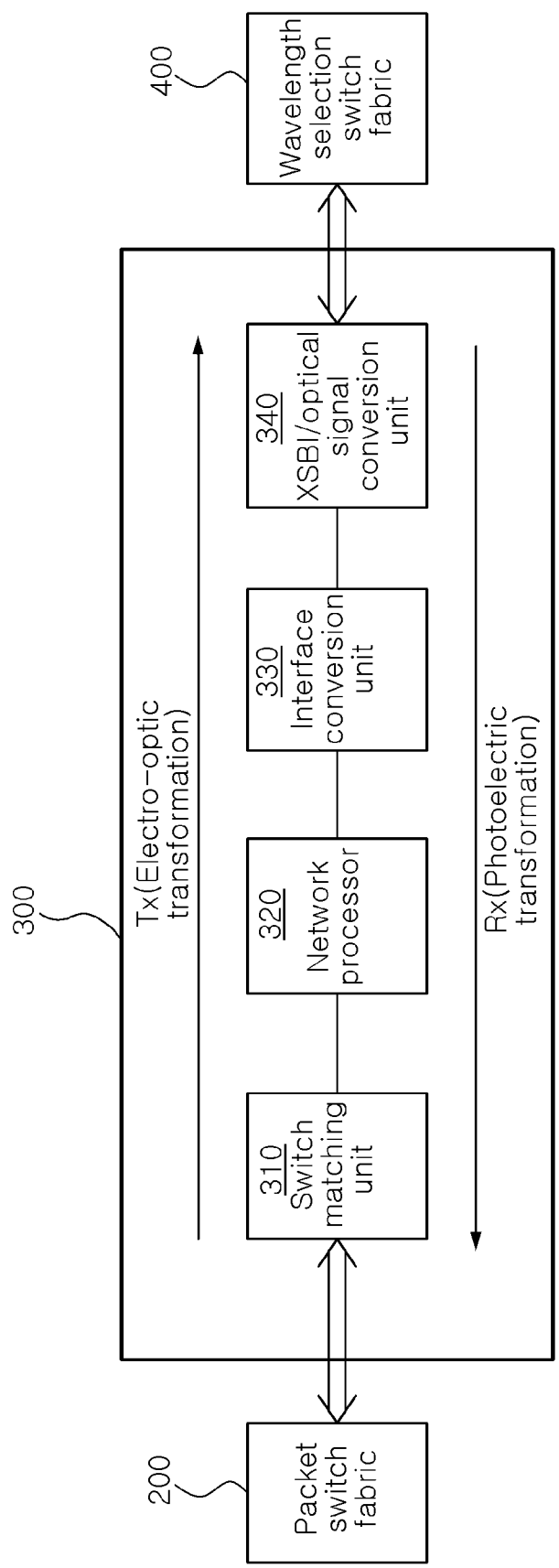
FIG. 3 is a schematic block diagram of a 10 GbE/OTU2 integrated line card according to an exemplary embodiment of the present invention.

FIG. 3 is a schematic block diagram of the 10 GbE/OTU2 integrated line card 300 according to an exemplary embodiment of the present invention.

With reference to FIGS. 2 and 3, the 10 GbE/OTU2 integrated line card 300 includes a switch matching unit 310, a network processor 320, an interface conversion unit 330, and an XSBI/optical signal conversion unit 340.

The switch matching unit 310 matches both interfaces between the packet switch fabric 200 and the network processor 320. The network processor 320 processes and classifies data included in the packet signal from the packet switch fabric 200 based on header information included in the packet signal. The interface conversion unit 330 converts the interface of the network processor 320 into a pre-set XSBI interface. The XSBI/optical signal conversion unit 340 converts an XSBI packet signal, a parallel signal which has passed through the interface conversion unit 330, into an optical signal having a pre-set wavelength.

Here, the XSIB refers to a 10-Gigabit Ethernet 16-bit interface defined by IEEE 802.3ae working group.

Figure 4:
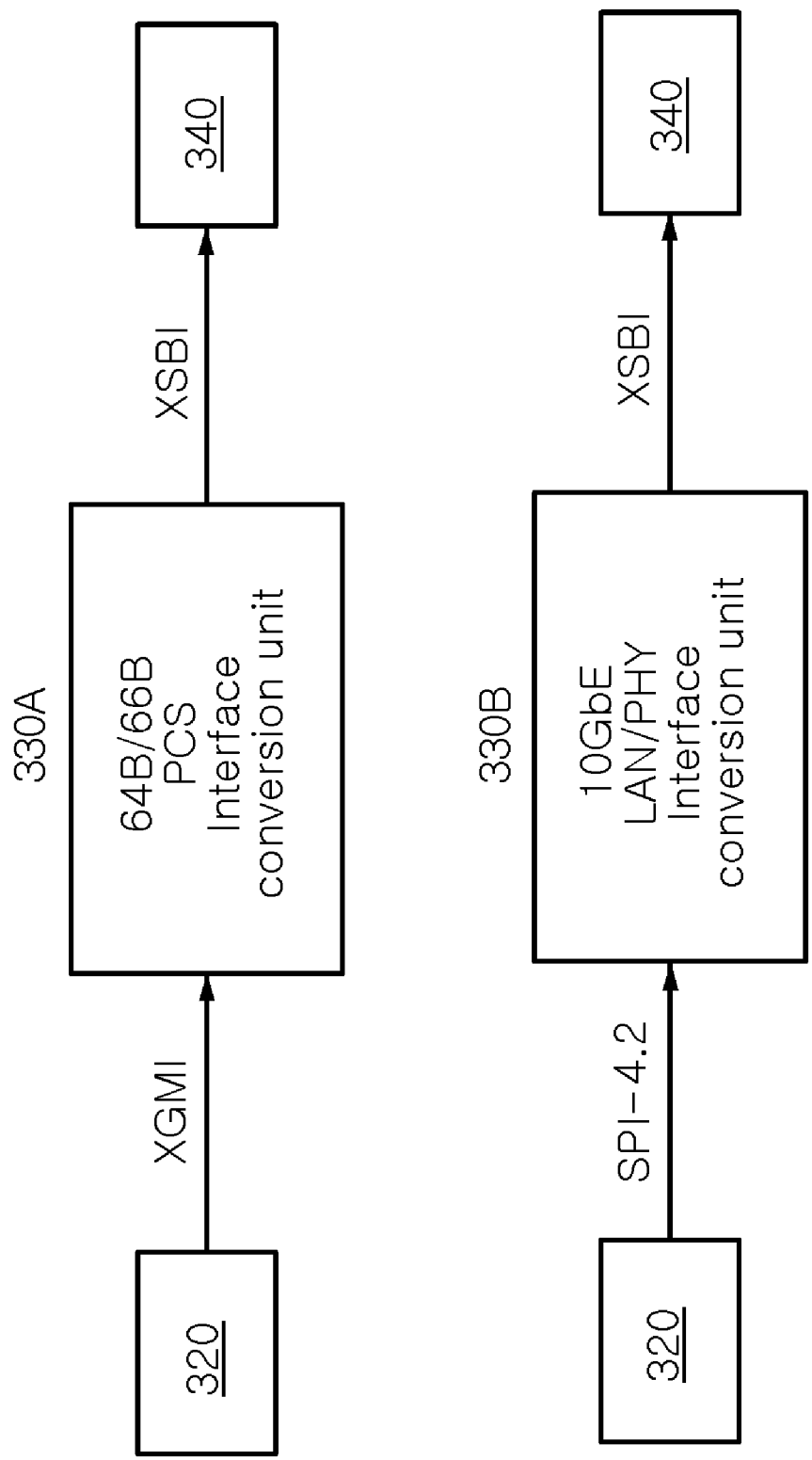
FIG. 4 is a schematic block diagram of an interface conversion unit within the 10 GbE/OTU2 integrated line card according to an exemplary embodiment of the present invention.

FIG. 4 is a schematic block diagram of the interface conversion unit 330 within the 10 GbE/OTU2 integrated line card 300 according to an exemplary embodiment of the present invention.

With reference to FIGS. 2 to 4, the interface conversion unit 330 may include a 64B/66B PCS interface conversion unit 330A or a LAN/PHY interface conversion unit 330B.

For example, if the interface of the network processor 320 is an XGMII interface, the interface conversion unit 330 may be configured as the 64B/66B PCS interface conversion unit 330A, and in this case, the 64B/66B PCS interface conversion unit 330A may convert an XGMII interface of the network processor 320 into an XSBI interface.

As a further example, if the interface of the network processor 320 is an SPI-4.2 interface, the interface conversion unit 330 may be configured as the 10 GbE LAN/PHY interface conversion unit 330B, and in this case, the 10 GbE LAN/PHY interface conversion unit 330B may convert an SPI-4.2 interface of the network processor 320 into an XSBI interface.

Here, the XGMII refers to a 10-Gigabit media independent interface, and the SPI-4.2 refers to a system packet interface version 4.2. And the LAN/PHY refers to a local area network (LAN) and a physical layer (PHY).

Figure 5:
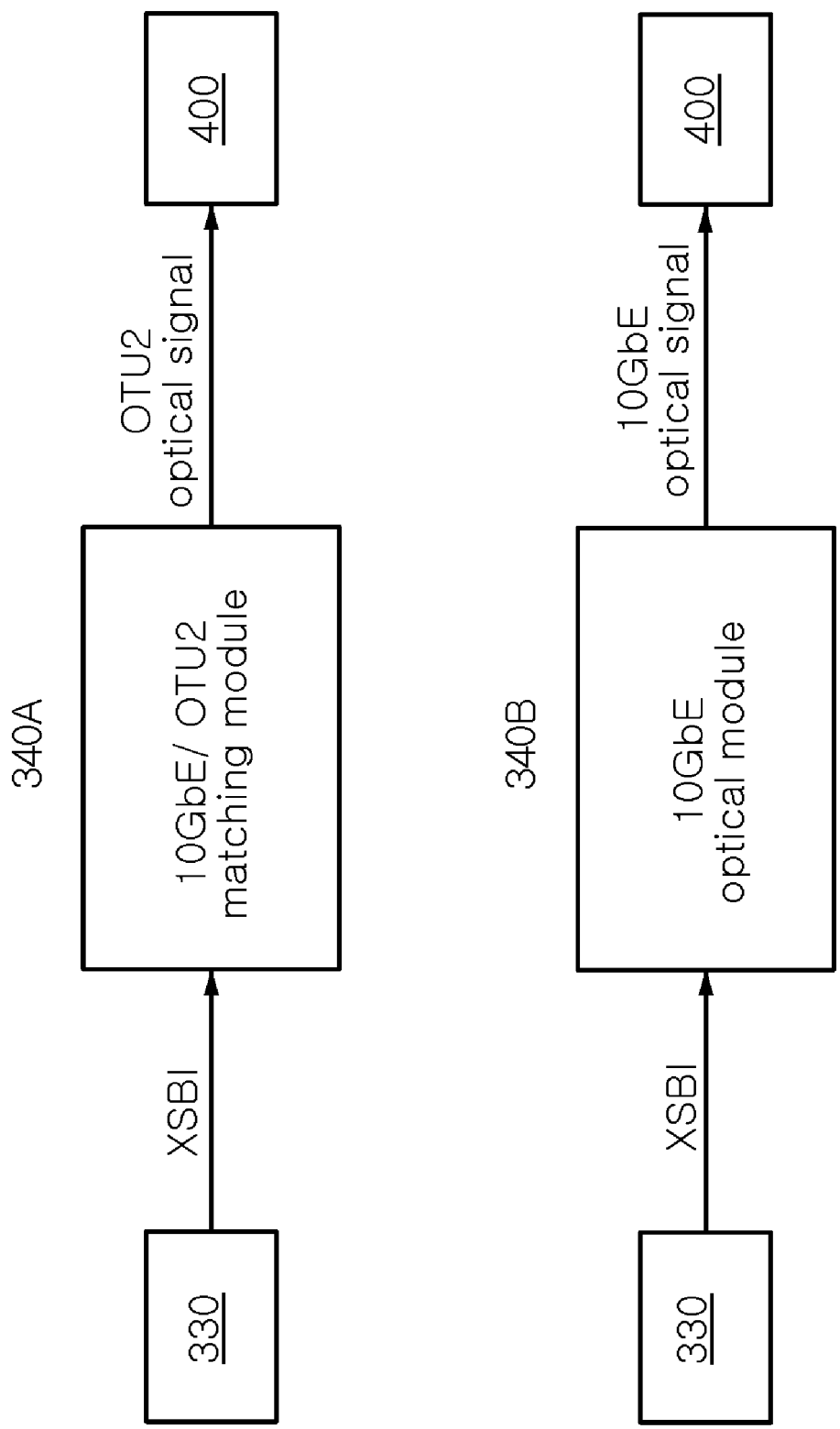
FIG. 5 is a schematic block diagram of an XSBI/optical signal conversion unit within the 10 GbE/OTU2 integrated line card according to an exemplary embodiment of the present invention.

FIG. 5 is a schematic block diagram of the XSBI/optical signal conversion unit 340 within the 10 GbE/OTU2 integrated line card 300 according to an exemplary embodiment of the present invention.

With reference to FIGS. 2 to 5, if conversion to an OTU2 optical signal is required, the XSBI/optical signal conversion unit 340 may be configured as a 10 GbE/OTU2 matching module 340A, and if conversion to a 10 GbE optical signal is required, the XSBI/optical signal conversion unit 340 may be configured as a 10 GbE optical module 340B.

For example, if the XSBI/optical signal conversion unit 340 is configured as the 10 GbE/OTU2 matching module 340A, it may convert the XSBI packet signal, the parallel signal which has passed through the interface conversion unit 330, into an OTU2 optical signal having a pre-set wavelength.

As a further example, if the XSBI/optical conversion unit 340 is configured as the 10 GbE optical module 340B, it may convert the XSBI packet signal, the parallel signal which has passed through the interface conversion unit 330, into a 10 GbE optical signal.

Figure 6:
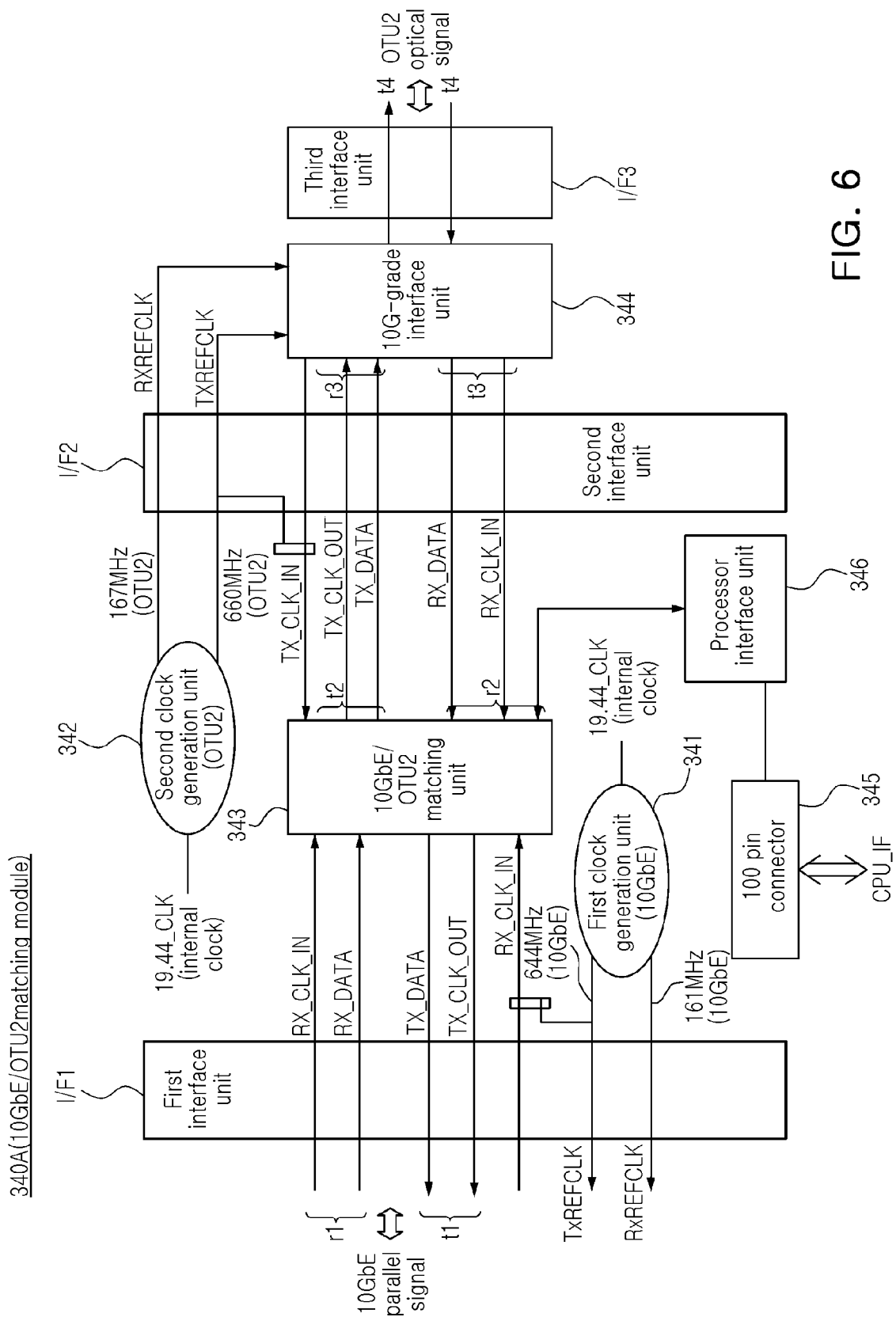
FIG. 6 is a circuit diagram of a 10 GbE/OTU2 matching module according to an exemplary embodiment of the present invention.

FIG. 6 is a circuit diagram of the 10 GbE/OTU2 matching module 340A according to an exemplary embodiment of the present invention.

With reference to FIGS. 2 to 6, the 10 GbE/OTU2 matching module 340A includes a first interface unit I/F1, a first clock generation unit 341, a second clock generation unit 342, a 10 GbE/OTU2 matching unit 343, a second interface unit I/F2, a 10G-grade optical module unit 344, and a third interface I/F3.

The first interface unit I/F1 receives the 10 GbE parallel signal from the interface conversion unit 330 and transfers it to the 10 GbE/OTU2 matching unit 343. The first clock generation unit 341 generates a first reference clock based on a pre-set internal clock, and the second clock generation unit 342 generates a second reference clock based on a pre-set internal clock. The 10 GbE/OTU2 matching unit 343 converts the 10 GbE parallel signal XSBI, which has been received from the first interface I/F1 according to the first reference clock, into an OTU2 parallel signal SFI-4 according to the second reference clock, and generates a synchronized clock. The second interface unit I/F2 transfers the OTU2 parallel signal SFI-4 and the synchronized clock from the 10 GbE/OTU2 matching unit 343 to the 10G-grade optical module unit 344. The 10G-grade optical module unit 344 converts the OTU2 parallel signal SFI-4 transferred from the second interface unit I/F2 into an OTU2 optical signal according to the synchronized clock, and transfers the converted OTU2 optical signal to an output stage via the third interface I/F3.

In this case, when the 10 GbE/OTU2 matching module 340A performs an electro-optic transformation, the first reference clock may have 161.133 MHz and the second reference clock may have 669.326 MHz.

Here, the first and second interface units I/F1 and I/F2 may each be configured as a 300-pin multi-source agreement (MSA) connector, and the third interface unit I/F3 may be configured as an LC optical connector.

Also, the first interface unit I/F1, the 10 GbE/OTU2 interface unit 343, the second interface unit I/F2, the 10G-grade optical module unit 344, and the third interface I/F3 of the 10 GbE/OTU2 matching module 340A may perform the reverse operations of the above process.

The reverse operations of the process will now be described in detail. The third interface unit I/F3 of the 10 GbE/OTU2 matching module 340A transfers the OTU2 optical signal from the input stage to the 10G-grade optical module unit 344. The 10G-grade optical module unit 344 converts the OTU2 optical signal from the third interface I/F3 into the OTU2 parallel signal SFI-4 according to the synchronized clock, and outputs the converted OTU2 parallel signal SFI-4 to the second interface unit I/F2. The second interface unit I/F2 transfers the OTU2 parallel signal SFI-4 from the 10G-grade optical module unit 344 to the 10 GbE/OTU2 matching unit 343. The 10 GbE/OTU2 matching unit 343 converts the OTU2 parallel signal SFI-4 from the second interface unit I/F2 into the 10 GbE parallel signal XSBI according to the second reference clock, and outputs the converted 10 GbE parallel signal XSBI to the first interface unit I/F1. The first interface unit I/F1 transfers the 10 GbE XSBI signal from the 10 GbE/OTU2 matching unit 343 to the interface conversion unit 330.

In this case, when the 10 GbE/OTU2 matching module 340A performs the photoelectric transformation, the first reference clock may have 167.332 MHz and the second reference clock may have 644.531 MHz.

The first and second clock generation units 341 and 342 will now be described with reference to FIG. 6.

As shown in FIG. 6, the first clock generation unit 341 generates a first reference clock RxREFCLK of 161.133 MHz to receive a 10 GbE signal r1 based on the 19.44 MHz clock, an internal clock, and generates a first reference clock TxREFCLK of 644.531 MHz to transmit a 10 GbE signal t1. In this case, the first reference clock of 161.133 MHz is used as the reception reference clock RxREFCLK for generating the reception clock of 644.531 MHz in synchronization with a 10 GbE reception signal 10 GbE Rx. The first reference clock of 644.531 MHz is used as the transmission reference clock for generating the transmission clock of 644.531 MHz in synchronization with a 10 GbE transmission signal 10 GbE Tx.

The second clock generation unit 342 generates a second reference clock TxREFCLK of 669.326 MHz to transmit an OTU2 signal t2 based on the 19.44 clock, the internal clock, and generates a second reference clock RxREFCLK of 167.332 MHz to receive an OTU2 signal r2. In this case, the second reference clock of 167.332 MHz is used as the reception reference clock RxREFCLK to generate the reception clock of 669.326 MHz in synchronization with an OTU2 reception signal OTU2 Rx. The second reference clock of 669.326 MHz is used as the transmission reference clock TxREFCLK to generate the transmission clock of 669.326 MHz in synchronization with an OTU2 transmission signal OTU2 Tx.

The output clock TxREFCLK from the second clock generation unit 342 may be used as a transmission reference clock, namely, a reference clock for the 10G-grade optical module 344 connected with the 10 GbE/OTU2 matching unit 343 to recover transmission data and the clock t2 in synchronization with the transmission data.

With reference to FIG. 6, the 10 GbE/OTU2 matching unit 343 receives a synchronized clock RX_CLK_IN and a reception data signal RX_DATA (r1 input) which have been generated based on the first reference clock RxREFCLK, generates an OTU2 data signal TX_DATA and a synchronized clock TX_CLK_OUT which have been converted based on the second reference clock TxREFCLK and TX_CLK_IN, and outputs the same (t2 output).

Also, the 10 GbE/OTU2 matching unit 343 receives a synchronized clock RX_CLK_IN and a reception data signal RX_DATA (r2 input) which have been generated based on the second reference clock RxREFCLK, generates a 10 GbE data signal TX_DATA and a synchronized clock TX_CLK_OUT which have been converted based on the first reference clock TxREFCLK and TX_CLK_IN, and outputs the same (t1 output).

With reference to FIG. 6, the 10G-grade optical module unit 344 receives a synchronized clock TX_CLK_IN and reception data signal TX_DATA which have been generated based on the second reference clock TxREFCLK (r3 input), generates a wavelength-tuned OTU2 optical signal, and outputs the same (t4 output).

Also, the 10G-grade optical module unit 344 receives a wavelength-tuned OTU2 optical signal (r4 input), generates a synchronized clock (RX_CLK_IN) and a reception data signal (RX_DATA) which have been generated based on the second reference clock RxREFCLK, and outputs the same (t3 output).

With reference to FIGS. 2 to 7, the 10 GbE/OTU2 matching unit 343 includes a 10 GbE MAC processing unit 343-1, a generic framing procedure (GFP) processing unit 343-2, an OPU2 processing unit 343-3, an ODU2 processing unit 343-4, and an OTU2 processing unit 343-5.

Figure 7:
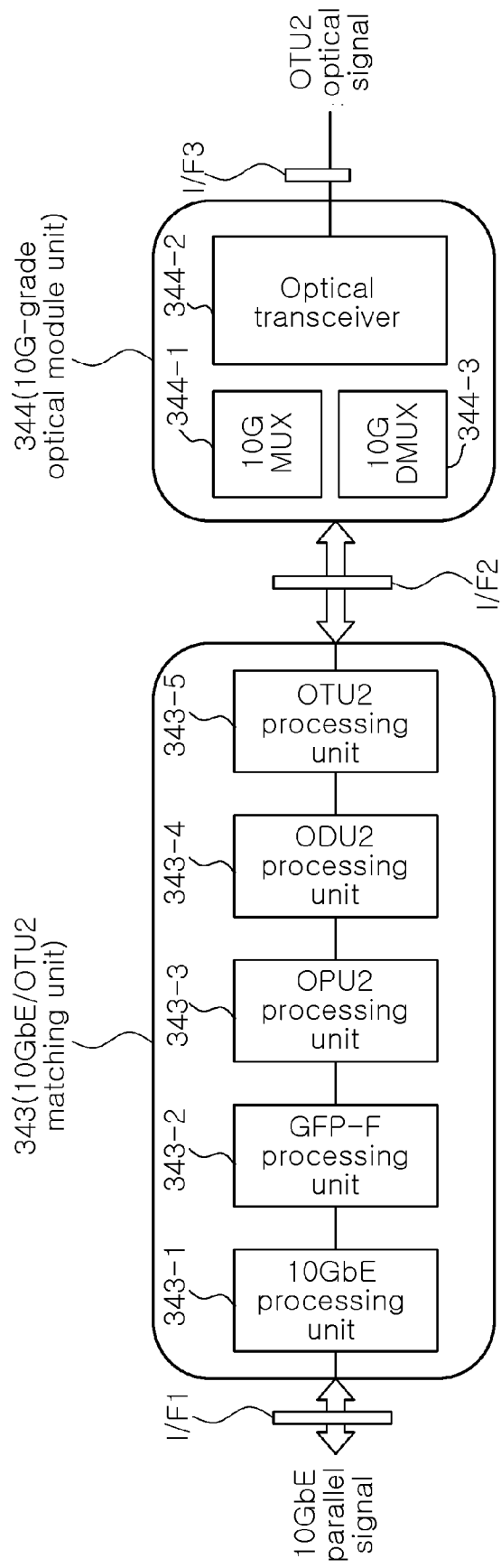
FIG. 7 illustrates an internal configuration of a 10 GbE/OTU2 matching unit and a 10G-grade optical module unit in FIG. 6.

As shown in FIG. 7, the 10 GbE MAC processing unit 343-1 performs 64B/66B decoding operation on the 10 GbE parallel signal XSBI from the first interface unit I/F1 to remove an inter-packet gap (IPG), a preamble, a start flag identifier (SFD) from the 10 Gbe parallel signal XSBI to acquire a pure MAC payload. The GFP processing unit 343-2 encapsulates the MAC payload from the 10 GbE MAC processing unit 343-1 into a GFP frame. The OPU2 processing unit 343-3 maps the GFP-F frame from the GFP processing unit 343-2 to a frame having an OPU2 over-header. The ODU2 processing unit 343-4 inserts an over-header of an ODU2 level to the OPU2 frame from the OPU2 processing unit 343-3. The OTU2 processing unit 343-5 inserts an over-header of an OTU2 level to a signal from the ODU2 processing unit 343-4 and outputs the over-header inserted signal via the third interface unit I/F3.

In this case, the 10 GbE MAC processing unit 343-1, the GFP processing unit 343-2, the OPU2 processing unit 343-3, the ODU2 processing unit 343-4, and the OTU2 processing unit 343-5 may each perform reverse operations of the above process.

The reverse operations of the process will now be described. The OTU2 processing unit 343-5, the ODU2 processing unit 343-4, and the OPU2 processing unit 343-3 sequentially remove the OTU2 over-header, the ODU2 over-header, and the OPU2 over-header from the signal via the third interface unit I/F3, respectively. The GFP processing unit 343-2 demaps the over-header removed OPU2 frame to the GFP frame and extracts a MAC payload from the GFP frame. And, the 10 GbE MAC processing unit 343-1 adds an IPG, a preamble, and a SFD to the MAC payload from the GFP processing unit 343-2, performs 64/66B encoding on the MAC payload to generate a 10 GbE parallel signal XSBI, and transmits the same via the first interface unit I/F1.

As shown in FIG. 7, the 10G-grade optical module unit 344 includes a 10G MUX 344-1, an optical transceiver 344-2, and a 10G DMUX 344-3.

The 10G MUX 344-1 converts the OTU2 parallel signal SFI-4 transferred from the second interface unit I/F2 into a 10G serial signal. The optical transceiver 344-2 converts the 10G serial signal from the 10G MUX 344-1 into an OTU2 optical signal, and outputs the converted OTU2 optical signal via the third interface unit I/F3.

The reverse operations of the process will now be described. The optical transceiver 344-2 converts the OTU2 optical signal from the third interface unit I/F3 into a 10G serial signal. The 10G DMUX 344-3 converts the 10G serial signal from the optical transceiver 344-3 into the OTU2 parallel signal SFI-4, and transfers the converted OTU2 parallel signal to the second interface unit I/F2.

Here, the MUX refers to a multiplexer and the DMUX refers to a demultiplexer.

Figure 8:
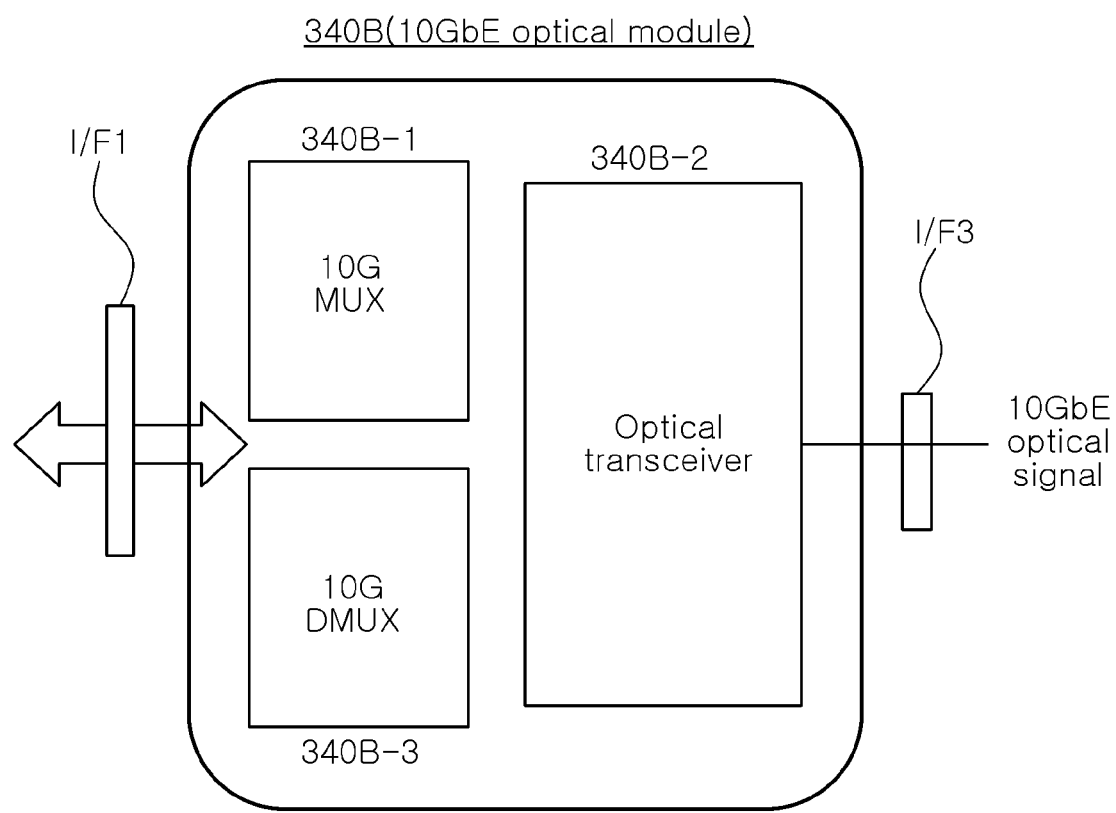
FIG. 8 illustrates an internal configuration of a 10 GbE optical module of FIG. 5.

FIG. 8 illustrates the internal configuration of the 10 GbE optical module 340B of FIG. 5.

With reference to FIGS. 5 to 8, the 10 GbE optical module 340B includes a 10G MUX 340B-1, an optical transceiver 340B-2, and a 10G DMUX 340B-3.

The 10G MUX 340B-1 converts the 10 GbE parallel signal XSBI transferred from the first interface unit I/F1 into a 10G serial signal and outputs the converted 10G serial signal to the optical transceiver 340B-2. The optical transceiver 340B-2 converts the 10G serial signal from the 10G MUX 340B-1 into a 10 GbE optical signal and outputs the converted 10 GbE optical signal via the third interface unit I/F3.

The reverse operations of the process will now be described. The optical transceiver 340B-2 converts the 10 GbE optical signal from the third interface unit I/F3 into a 10G serial signal and outputs the converted 10G serial signal to the 10G DMUX 340B-3. The 10G DMUX 340B-3 converts the 10G serial signal from the optical transceiver 340B-2 into the 10 GbE parallel signal XSBI and transfers the converted 10 GbE parallel signal XSBI to the first interface unit I/F1.

Figure 9:
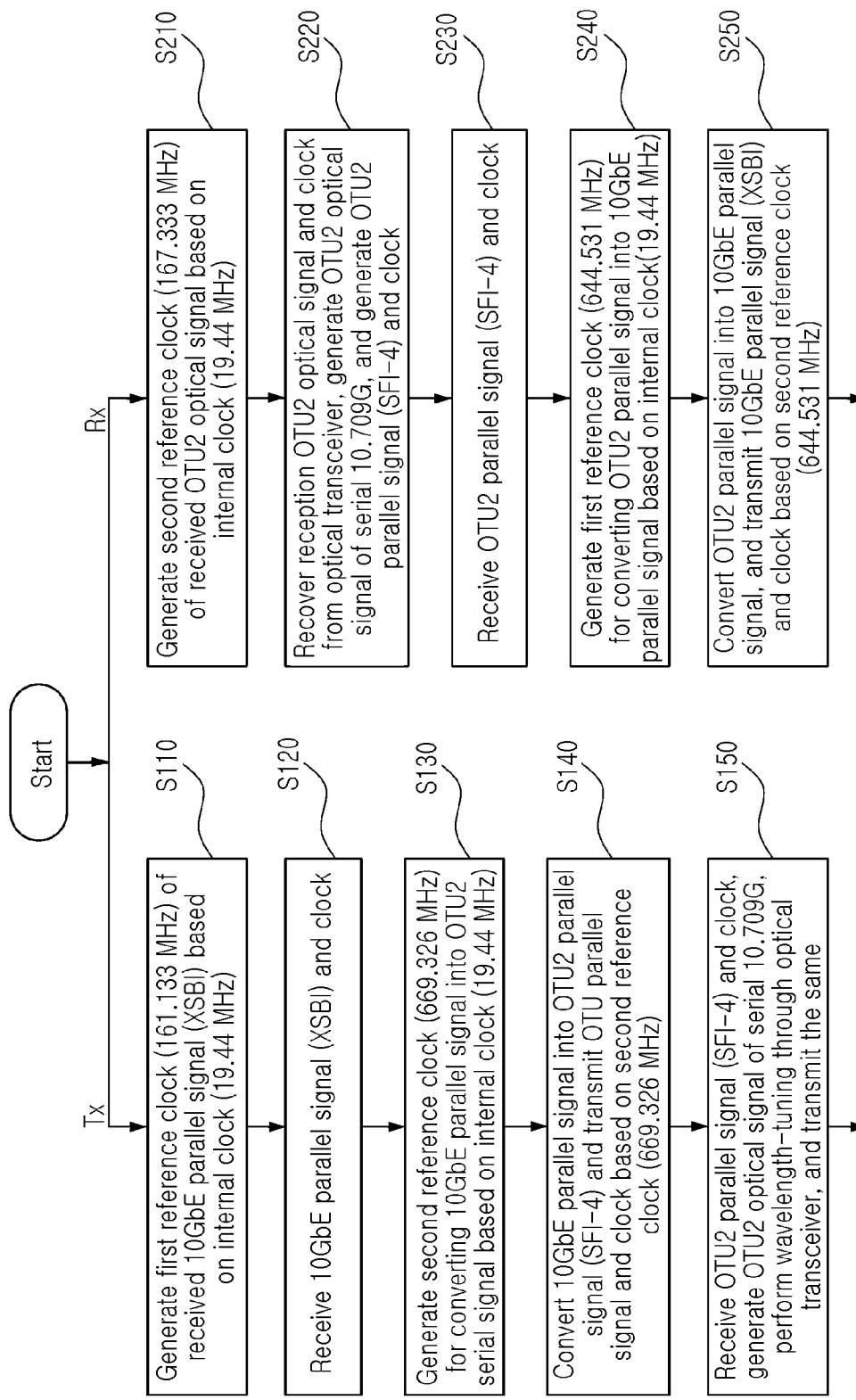
FIG. 9 is a flow chart illustrating the process of a transmission and reception operation of the 10 GbE/OTU2 matching module of FIG. 6.

FIG. 9 is a flow chart illustrating the process of a transmission and reception operation of the 10 GbE/OTU2 matching module 340A of FIG. 6.

With reference to FIG. 9, steps S110, S120, S130, S140, and S150 show a transmission process (electro-optic transformation process) of the 10 GbE/OTU2 matching module 340A, and steps S210, S220, S230, S240, and S250 show a reception process (photoelectric transformation process) of the 10 GbE/OTU2 matching module 340A.

In the transmission direction (Tx) of the 10 GbE/OTU2 matching module 340A, the first reference clock 161.133 MHz is generated to receive the 10 GbE parallel signal XSBI based on the internal clock of 19.44 MHz (S110). The externally generated 10 GbE signal XSBI and the clock are received based on the first reference clock of 161.133 MHz (S120). Next, the second reference clock of 669.326 MHz for converting the reception 10 GbE signal into the transmission OTU2 signal is generated based on the internal clock of 19.44 MHz (S130). Here, steps S130 may be concurrently performed with step S110.

Thereafter, the reception 10 GbE signal is converted into the OTU2 signal, and the OTU2 parallel signal SFI-4 and the clock based on the second reference clock of 669.326 MHz are transmitted (S140). Upon receiving the OTU2 parallel signal SFI-4 and the clock, the OTU2 data of serial 10.709G is generated and wavelength-tuned via the optical transceiver, which is then transmitted to outside (S150).

In the reception direction (Rx) of the 10 GbE/OTU2 matching module 340A, the second reference clock of 167.332 MHz is generated to receive the OTU2 optical signal based on the internal clock of 19.44 MHz (S210). And, the reception OTU2 data and clock from the optical transceiver are recovered to generate the OTU2 data of serial 10.709G, and the OTU2 parallel signal SFI-4 and the clock are generated (S220). Subsequently, the OTU2 parallel signal SFI-4 and the clock are received (S230), and the first reference clock of 644.531 MHz for converting the reception OTU2 signal into the transmission 10 GbE signal is generated based on the internal clock of 19.44 MHz (S240). Here, step S240 may be concurrently performed with step S210.

Thereafter, the reception OTU2 signal is converted into the 10 GbE signal, and the 10 GbE parallel signal XSBI and the clock based on the second reference clock of 644.531 MHz are transmitted (S250).

Meanwhile, an external local processor (not shown) for operating, maintaining and repairing, and monitoring and controlling the matching apparatus of the present invention may be provided and connected with a 100-pin connector 345 via a CPU interface CPU_IF. The matching apparatus can communicate with the external processor via a processor interface 346 connected with the 100-pin connector 345.

As set forth above, according to exemplary embodiments of the invention, because the line cards of the packet switch and the optical transponder of the optical switch are integrated, conversion and switching can be simply performed between an Ethernet (10 GbE) packet signal and an OTU2 optical signal, and because the repeated element is omitted, the production cost can be reduced, and because the Ethernet (10 GbE) optical signal or the OTU2 optical signal are selectively generated, the application range can be extended to obtain a flexible effect.

Namely, in the packet-optical integrated switch without using an optical transponder, conversion into an OTU2 optical signal is made through the 10 GbE/OTU2 conversion module, and for a connection with the optical switch using the optical transponder, conversion into the Ethernet (10 GbE) optical signal is made through the 10 GbE optical module, thereby selectively outputting the Ethernet (10 GbE) optical signal or the OTU2 optical signal and thus allowing for a flexible application structure.

While the present invention has been shown and described in connection with the exemplary embodiments, it will be apparent to those skilled in the art that modifications and variations can be made without departing from the spirit and scope of the invention as defined by the appended claims.

What is claimed is:

1. A packet-optical integrated switch, comprising:
    a packet line card configured to output an Ethernet packet signal to a pre-set output port, the packet signal including a destination address corresponding to the pre-set output port;
    a packet switch fabric configured to transfer the packet signal from the packet line card to the pre-set output port;
    a 10 gigabit Ethernet (10 GbE)/optical transport unit level 2 (OTU2) integrated line card configured to convert the packet signal from the packet switch fabric into an OTU2 optical signal having a pre-set wavelength and to convert an OTU2 optical signal having a pre-set wavelength into a packet signal; and
    a wavelength selection switch fabric including at least one port, and configured to allocate the optical signal from the 10 GbE/OTU2 integrated line card to a pre-set wavelength division multiplexing (WDM) port by pre-set wavelength to exchange the optical signal to the at least one port by wavelength;
    wherein the 10 GbE/OTU2 integrated line card comprises:
    a switch matching unit, a network processor, an interface conversion unit, and an XSBI/optical signal conversion unit,
    wherein the switching matching unit matches interface between the packet switch fabric and the network processor,
    the network processor processes and classifies data included in the packet signal from the packet switch fabric based on header information included in the packet signal,
    the interface conversion unit converts an interface of the network processor into a pre-set XSBI interface, and the XSBI/optical signal conversion unit converts an XSBI packet signal, a parallel signal which has passed through the interface conversion unit, into an optical signal having a pre-set wavelength.

2. The packet-optical integrated switch of claim 1, further comprising:
an amplifying unit configured to amplify the WDM optical signal from the wavelength selection switch fabric into a pre-set size, or to amplify an input WDM optical signal, and output the amplified input WDM optical signal to the wavelength selection switch fabric.

3. The packet-optical integrated switch of claim 1, wherein the interface conversion unit is one of a 64B/66B PCS interface conversion unit that converts the interface of the network processor from an XGMII interface into the XSBI interface, and a LAN/PHY interface conversion unit that converts the interface of the network process from an SPI-4.2 interface into the XSBI interface.

4. The packet-optical integrated switch of claim 1, wherein the XSBI/optical signal conversion unit is one of a 10 GbE/OTU2 matching module for converting the XSBI packet signal, the parallel signal which has passed through the interface conversion unit, into an OTU2 optical signal having a pre-set wavelength, and a 10 GbE optical module for converting the XSBI packet signal, the parallel signal which has passed through the interface conversion unit, into a 10 GbE optical signal.

5. The packet-optical integrated switch of claim 4, wherein the 10 GbE/OTU2 matching module comprises:
a first interface unit configured to receive a 10 GbE parallel signal from the interface conversion unit;
a first clock generation unit configured to generate a first reference clock based on a pre-set internal clock;
a second clock generation unit configured to generate a second reference clock based on the pre-set internal clock;
a 10 GbE/OTU2 matching unit configured to convert the 10 GbE parallel signal, which has been received from the first interface unit based on the first reference clock, into an OTU2 parallel signal according to the second reference clock, and generate a synchronized clock;
a second interface unit configured to transfer the OTU2 parallel signal and the synchronized clock from the 10 GbE/OTU2 matching unit;
a 10G-grade optical module unit configured to convert the OTU2 parallel signal transferred from the second interface unit into an OTU2 optical signal according to the synchronized clock; and
a third interface configured to transfer the OTU2 optical signal from the 10G-grade optical module unit to an output stage.

6. The packet-optical integrated switch of claim 5, wherein when the GbE/OTU2 matching module performs electro-optic transformation, the first reference clock has a rate of 161.133 MHz and the second reference clock has a rate of 669.326 MHz, and when the 10 GbE/OTU2 matching module performs photoelectric transformation operation, the first reference clock has a rate of 167.332 MHz and the second reference clock has a rate of 644.531 MHz.

7. The packet-optical integrated switch of claim 5, the 10 GbE/OTU2 matching unit comprising:
a 10 GbE MAC processing unit configured to perform a 64B/66B decoding process on the 10 GbE parallel signal from the first interface unit to remove an inter-packet gap, a preamble, a start flag identifier from the 10 GbE parallel signal to acquire a pure MAC payload;
a generic framing procedure (GFP) processing unit configured to form the MAC payload from the 10 GbE MAC processing unit, as a GFP frame through encapsulation;
an OPU2 processing unit configured to map a GFP-F frame from the GFP processing unit to a frame having an OPU2 over-header;
an ODU2 processing unit configured to insert a over-header of an ODU2 level into an OPU2 frame from the OPU2 processing unit; and
an OTU2 processing unit configured to insert an over-header of an OTU2 level into a signal from the ODU2 processing unit.

8. A packet-optical integrated switch, comprising:
a packet switch fabric configured to output an Ethernet packet signal to a pre-set output port, the packet signal including a destination address corresponding to the pre-set output port; and
a 10 gigabit Ethernet (10 GbE)/optical transport unit level 2 (OTU2) integrated line card configured to convert the packet signal from the packet switch fabric into an OTU2 optical signal having a pre-set wavelength;
wherein the 10 GbE/OTU2 integrated line card comprises:
a switch matching unit, a network processor, an interface conversion unit, and an XSBI/optical signal conversion unit,
wherein the switching matching unit matches interface between the packet switch fabric and the network processor,
the network processor processes and classifies data included in the packet signal from the packet switch fabric based on header information included in the packet signal,
the interface conversion unit converts an interface of the network processor into a pre-set XSBI interface, and
the XSBI/optical signal conversion unit converts an XSBI packet signal, a parallel signal which has passed through the interface conversion unit, into an optical signal having a pre-set wavelength.

* * * * *